Figure 4:
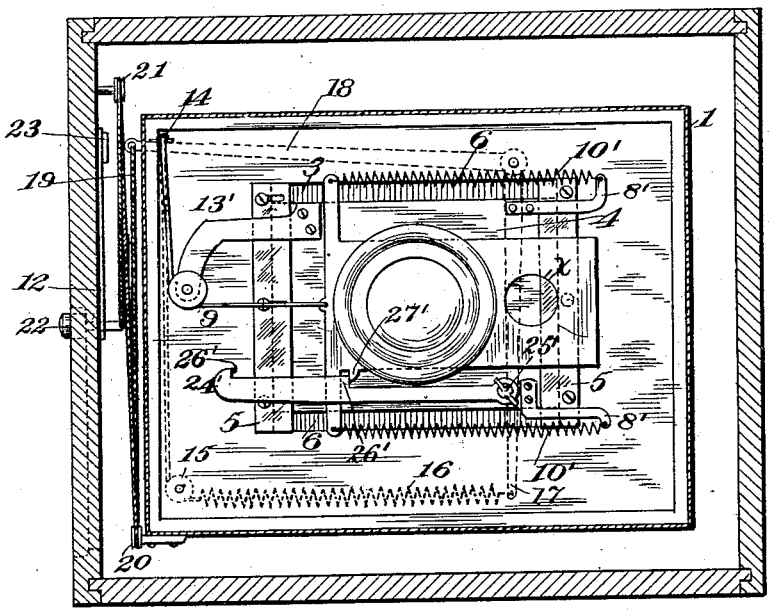

No. 720,586. PATENTED FEB. 17, 1903.
L. J. R. HOLST.
PHOTOGRAPHIC CAMERA.
APPLICATION FILED APR. 24, 1901.
NO MODEL. 2 SHEETS—SHEET 1.
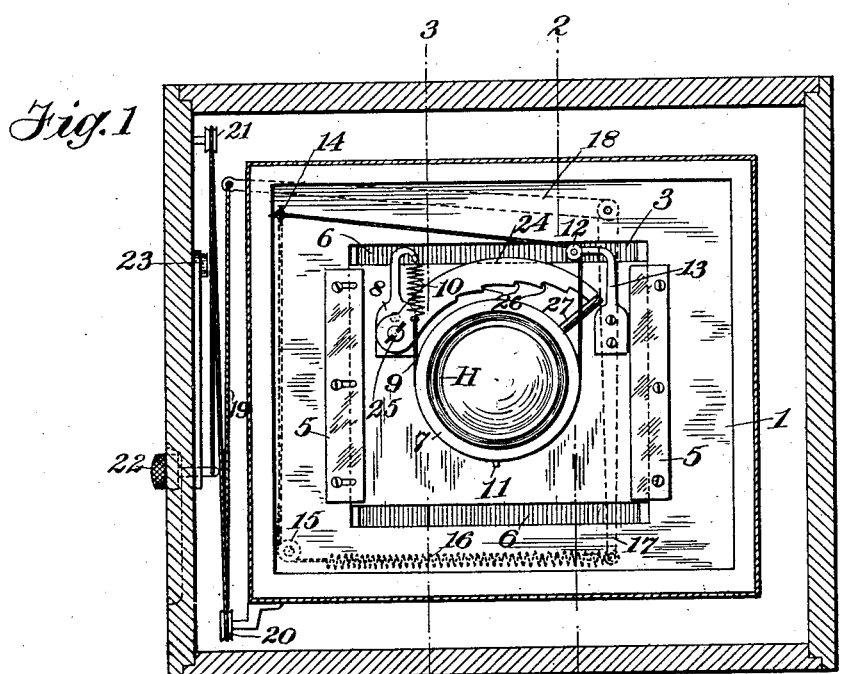
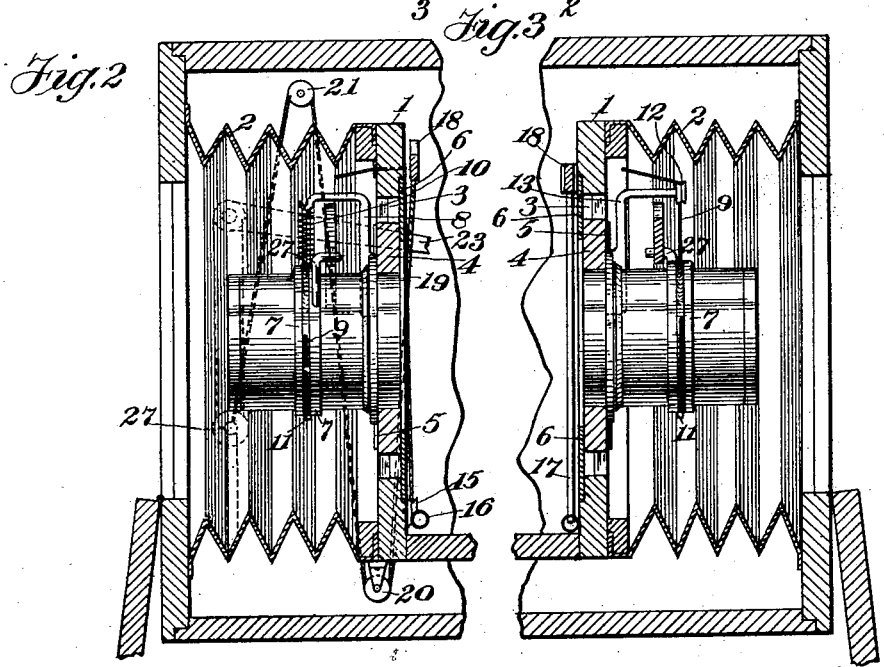

UNITED STATES PATENT OFFICE.

LODEWYK J. R. HOLST, OF BROOKLYN, NEW YORK, ASSIGNOR OF TWO-THIRDS TO LOUIS BORSUM, OF PLAINFIELD, NEW JERSEY.

PHOTOGRAPHIC CAMERA.

SPECIFICATION forming part of Letters Patent No. 720,586, dated February 17, 1903.

Application filed April 24, 1901. Serial No. 57,288. (No model.)

*To all whom it may concern:*

Be it known that I, LODEWYK JAN RUTGER HOLST, (formerly a subject of the Queen of the Netherlands, but having declared my intention of becoming a citizen of the United States and having taken out my first naturalization-papers,) residing in the borough of Brooklyn, State of New York, have invented certain new and useful Improvements in Photographic Cameras, of which the following is a specification.

This invention is particularly applicable to cameras of the class employing a mirror "finder," although not in all respects so limited, and specially to the general style and arrangement of finder disclosed in United States Letters Patent No. 589,349, granted to me August 31, 1897.

Aside from special details of construction there are two primary features of the invention. In properly focusing or fixing the image on a finder the use of the full diaphragm diameter or opening of the lens is desirable or necessary, while under certain conditions in taking the picture it is desirable that the diameter be reduced. In cameras constructed according to this invention I employ any ordinary adjustable diaphragm-lens and provide that in focusing its effective diameter shall be at a maximum or of any less diameter to which the diaphragm may be set and that the diaphragm-opening shall be automatically reduced to any predetermined extent at the time of taking the picture, the lens-diaphragm, finder, and shutter being controlled in proper sequence of operation by manipulation of a single device. The lens having been properly focused by the aid of the finder-mirror, depression or other actuation of a single button, stud, or device controlling the operation of the camera effects the removal of the finder-mirror from the path of the cone of light, the reduction of the diaphragm-opening to the predetermined diameter, and, finally, the tripping or actuation of the shutter. The two earlier operations may occur independently in succession in either order, or they may occur during the same period, the shutter being operated after their completion.

In cameras having finder-mirrors of the general character shown in my patent before mentioned it is desirable, to suit varying conditions, that the lens should be vertically adjustable. In practical camera construction it is of the utmost importance that space should be economized and the dimensions of the camera-box reduced to its lowest terms. To fulfil these requirements, I mount the lens-carrying board within an opening in the partition supporting it, so that the planes of the front and rear faces of the board shall not lie outside of like planes bounding the front and rear faces of the partition, means being provided for effecting the vertical adjustment of the lens-board within the opening.

In accompanying drawings I have shown the invention embodied in a form which is deemed to be practical and efficient and which is the form now best known to me. It will be obvious, however, upon due consideration that mere details may be varied by those skilled in the art without departing from the principles or mode of operation of my invention.

Figure 1 is a transverse section through a camera on a plane in front of the lens; Fig. 2, a transverse section on the line 2 2 of Fig. 1; Fig. 3, a transverse section on the line 3 3 of Fig. 1. Fig. 4 is a cross-section taken in front of the lens, showing a sliding adjustable diaphragm.

I have deemed it unnecessary to illustrate the finder-mirror, shutter, and plate-holder, as their construction and arrangement are well understood and may be of any appropriate character—as, for instance, of the general kind disclosed in my prior patent above mentioned.

1 is the lens-carrying partition, adjustable back and forth for focusing in any usual way, and 2 is the bellows. In the partition is formed an opening 3, within which the lens-carrying board 4 is fitted to slide vertically, the board being mounted entirely within the opening and not projecting beyond the partition on either side. The lens-board is held frictionally in position by side plates 5, which may be attached to the partition by screws, as shown. Light-guards 6, consisting of thin strips, as of black celluloid, are attached to and countersunk in the rear face of the partition and cover the openings that may exist at the upper and lower edges of the lens-board.

In Figs. 1, 2, and 3 I have shown a lens with an adjustable iris-diaphragm H, whose expansion and contraction is controlled by a rotatable ring 7. To a fixed point on the lens-board 4, which fixed point may be a suitable bracket or angle-piece 8, attached to the lens-board, is attached a flexible connection comprising a cord 9 and a coiled spring 10, interposed between the part 8 and the end of the cord. The cord passes thence around the ring 7, a turn in the cord being taken around a pin or projection 11 thereon, or the cord may be attached thereto in any suitable manner, then up to and over a pulley 12, mounted in a bracket or angle-piece 13, also secured upon the lens-board, thence through an opening 14 in an upper corner of the partition to the rear side of the partition, thence downwardly around a pulley 15 on the partition, where its end is connected with a coiled spring 16 of suitable dimensions and tension, the opposite end of which is connected to the downwardly-extending short arm 17 of a bell-crank lever mounted on the partition and whose longer arm 18 extends across the rear face of the partition and lens-board and terminates adjacent the side of the camera-box. The end of the lever is connected to a cord 19, extending downwardly around a pulley 20, mounted on the movable partition, thence upwardly around a pulley 21, mounted on the box, and thence downwardly, its end being attached to the actuating or tripping device 22 of the camera. The button 22 is shown as movable vertically in a slot in the side of the camera-box. When depressed, it actuates the lever 23, corresponding, for instance, with the lever having similar functions in my patent before mentioned, in which it is designated by the letter M. Pivotally mounted on the lens-board is a curved or segmental arm 24, held in any desired position by a set-screw 25 and having in its edge adjacent the lens a series of steps or notches 26, with which a radial arm 27 on the rotative ring 7 may engage. It will be observed that in the vertical adjustment of the lens-board the variations in distance between the pulley 12 and aperture 14 are slight and will be compensated by the initial and therefore relatively weak tension of the spring 16. This spring is also made of such character and length as to in like manner compensate for the movement of the pulley 20 relatively to the pulley 21. The reaction of the spring 10 tends normally to rotate the ring or flange 7 in such directions as to expand or open the iris-diaphragm, and the tension of the spring 16 is such as to overcome that of the spring 10. When the tripping-button 22 is depressed or actuated, it operates upon the lever 23, which lifts the finder-mirror and at the same time, through the connections described, rotates the flange or ring 7, contracting the diaphragm of the lens until the radial arm 27 comes against the end of the segment 24 or one of the shoulders 26, when the contraction is arrested. Further depression of the button 22, which is permitted by the expansion of spring 16, effects the tripping of the shutter.

In Fig. 4 a sliding lens-diaphragm is shown. It has a large opening and a small one $x$. Springs 10' 10', attached to projecting parts at one end of the slide, have their other ends secured to brackets 8' 8' on the lens-board. Two springs are employed to prevent binding of the slide in its ways. Their reaction is such as to tend to hold the larger opening in operative relation to the lens. The cord 9' is attached to the slide and passes thence over a pulley in a bracket 13', also attached to the lens-board, to the opening 14. The stop-arm 24', pivoted on the lens-board below the diaphragm, has two shoulders 26', adapted to be engaged by the stop projection 27' on the diaphragm. The arm 24' is set in the desired position by the set-screw 25'. The general operation is obviously the same as that already described.

I claim as my invention—

1. In a photographic camera having a shutter, the combination with the shutter-actuating device, of an adjustable lens-diaphragm, and operative connections between the two whereby the diaphragm is adjusted before the shutter is actuated.

2. In a photographic camera, the combination with the shutter-actuating and mirror-finder-moving device, of an adjustable lens-diaphragm, and operative connections between said device and diaphragm whereby the diaphragm is adjusted before the shutter is actuated.

3. In a photographic camera, the combination of a vertically-adjustable lens, an adjustable lens-diaphragm associated therewith, a shutter-actuating and mirror-finder-moving device, and operative connections including a compensating spring between said device and the lens-diaphragm whereby the diaphragm is adjusted before the shutter is actuated.

4. In a photographic camera, the combination of a focusing-lens, an adjustable lens-diaphragm associated therewith, a shutter-actuating and mirror-finder-moving device, and operative connections including a compensating spring between said device and the lens-diaphragm whereby the diaphragm is adjusted before the shutter is actuated.

5. In a photographic camera, the combination of a vertically-adjustable focusing-lens, an adjustable lens-diaphragm associated therewith, a shutter-actuating and mirror-finder-moving device, and operative connections including a compensating spring between said device and lens-diaphragm whereby the diaphragm is adjusted before the shutter is actuated.

6. In a photographic camera, the combination with the shutter-actuating device, of an adjustable lens-diaphragm, a spring normally acting to maintain the maximum diaphragm-opening, operative connections including a spring of greater tension than the first-named spring between said device and the diaphragm, and a stop for determining the adjustment of the diaphragm, whereby after the diaphragm is adjusted by the movement of said device the spring of greater tension permits a further movement of said device to actuate the shutter.

7. In a photographic camera, the combination with the shutter-actuating and mirror-finder-moving device, of an adjustable lens-diaphragm, a spring normally acting to maintain the maximum diaphragm-opening, operative connections including a spring of greater tension than the first-named spring between said device and the diaphragm, and a stop determining the adjustment of the diaphragm, whereby after the diaphragm is adjusted and the finder-mirror removed from the path of the cone of light, by the actuation of said device, the spring of greater tension permits a further movement of said device to actuate the shutter.

8. In a photographic camera, the combination with a shutter-actuating and finder-mirror-moving device mounted on the camera-box, of an adjustable lens-diaphragm mounted on the movable lens-partition, a spring acting normally to maintain the maximum diaphragm-opening, a stop for determining the adjustment of the diaphragm, and flexing operative connections including a spring of greater strength than the first-named spring between said device and the diaphragm, whereby after the diaphragm is adjusted by the actuation of said device, the spring of greater strength permits a further movement of said device to actuate the shutter.

9. In a photographic camera, the combination with the shutter-actuating and mirror-finder-moving device, of an adjustable iris lens-diaphragm, and operative connections between said device and diaphragm whereby the diaphragm is contracted to a predetermined extent before the shutter is actuated.

10. In a photographic camera, the combination with the shutter-actuating and mirror-finder-moving device, of an adjustable iris lens-diaphragm, a spring normally acting to expand the diaphragm, operative connections including a spring of greater tension than the diaphragm-expanding spring between said device and the diaphragm, and an adjustable stop determining the contraction of the diaphragm, whereby after the diaphragm is contracted and the finder-mirror removed from the path of the cone of light by the actuation of said device, the spring of greater tension permits a further movement of said device to actuate the shutter.

11. In a photographic camera, the combination of the lens-partition having an opening therein, the vertically-adjustable lens-board seated within said opening, light-guards applied at the upper and lower edges of the opening, an adjustable lens-diaphragm mounted in the board, a spring normally acting to maintain the maximum diaphragm-opening and an adjustable stop to limit the adjustment of the diaphragm, the shutter-actuating and finder-mirror-moving device mounted on the camera-box, and flexing operative connections between said device and the diaphragm mounted partly on the box, partition and lens-board and including a spring of greater tension than the first-named spring, whereby in the actuation of said device the spring of greater tension, after the adjustment of the diaphragm permits a further movement of the device to actuate the shutter.

In testimony whereof I have hereunto subscribed my name.

L. J. R. HOLST.

Witnesses:
KATHARINE MACMAHON,
EDWARD C. DAVIDSON.